(12) United States Patent
Kienzle et al.

(10) Patent No.: US 7,516,488 B1
(45) Date of Patent: Apr. 7, 2009

(54) PREVENTING DATA FROM BEING SUBMITTED TO A REMOTE SYSTEM IN RESPONSE TO A MALICIOUS E-MAIL

(75) Inventors: Darrell Kienzle, Vienna, VA (US); James Croall, Washington, DC (US)

(73) Assignee: Symantec Corporation, Cupertino, CA (US)

( * ) Notice: Subject to any disclaimer, the term of this patent is extended or adjusted under 35 U.S.C. 154(b) by 808 days.

(21) Appl. No.: 11/064,170

(22) Filed: Feb. 23, 2005

(51) Int. Cl.
*G06F 11/00* (2006.01)

(52) U.S. Cl. .......................... 726/22; 726/23

(58) Field of Classification Search ............ 726/11–13, 726/22–24; 713/170, 150–154
See application file for complete search history.

(56) References Cited

U.S. PATENT DOCUMENTS

2002/0083093 A1* 6/2002 Goodisman et al. ......... 707/511
2006/0168006 A1* 7/2006 Shannon et al. ............. 709/206

OTHER PUBLICATIONS

Dyck, Timothy, Review: Teros-100 APS 2.1.1, [Online] May 28, 2003, [Retrieved from the Internet on Oct. 6, 2004] Retrieved from the Internet: <URL: http://www.eweek.com/article2/0, 1759, 1110435,00.asp>, Woburn, MA, U.S.A.

* cited by examiner

*Primary Examiner*—Hosuk Song
(74) *Attorney, Agent, or Firm*—Fenwick & West LLP

(57) ABSTRACT

An electronic message manager (100) examines (210) incoming electronic messages and determines (220) whether an incoming electronic message comprises at least one suspect link associated with a remote system. In response to the determination (220) that the incoming message comprises at least one suspect link, the electronic message manager (100) replaces (230) each suspect link with a redirection link. In response to a user attempting (240) to connect to the remote system by clicking on the redirection link, the electronic message manager directs the user to a remote analysis site for deciding (260) whether that incoming message comprises a phishing message.

26 Claims, 4 Drawing Sheets

PREVENTING DATA FROM BEING SUBMITTED TO A REMOTE SYSTEM IN RESPONSE TO A MALICIOUS E-MAIL

TECHNICAL FIELD

The present invention relates generally to computer security, and more particularly to preventing the submission of data in response to a malicious e-mail message.

BACKGROUND ART

Phishing is a fraudulent activity that attempts to elicit personal, confidential, and/or financial information from unwitting victims. Phishing generally entails sending large numbers of electronic messages that fraudulently claim to be from a legitimate organization instructing the recipient to click on a link that leads to an official-looking yet bogus website. Once there, the user is encouraged to input confidential information such as credit card, Social Security, and/or bank-account numbers. The electronic message and the bogus website typically appear authentic, and may convey a message such as "the bank has lost some records and needs to verify information." The site typically includes an electronic form into which the user is directed to enter the requested information. The form, while official looking and seemingly addressed to a legitimate organization, channels the information to a third party, who misappropriates the confidential information.

The frequency of phishing campaigns is increasing at a dramatic and alarming rate. To illustrate just how clever phishing attacks can be, consider the phishing of PayPal®. Instead of using the letter "l" in PayPal®, the perpetrator used a san serif numeral "1," which looks the same. Even professional security analysts took several days to identify and resolve this scam—in spite of it being right in front of their faces! Phishing is as much an attack of con artists as it is of hackers.

Counter measures to protect users from phishing have achieved limited success. Proposals for limiting phishing include electronic message authentication techniques using antispam standards and scanning for "cousin" domains whereby trademark owners are notified when a similar sounding Uniform Resource Locator (URL) or site contains spoofed content. Additionally, features such as Norton Privacy Control in Symantec's Norton Internet Security product help to stem the increasing number of phishing attacks by allowing users to identify confidential data that they wish to protect. Upon observing the previously identified confidential data being transmitted via HTTP (via the web), instant messenger, or SMTP (via electronic message), the user is prompted to provide verification that the disclosure of the confidential information is authorized. Unfortunately, when a phishing attack is successful, the user believes that they are transmitting their confidential information to a reputable website, thus circumventing the intervention and causing the user to authorize the release of sensitive information to what is actually an illicit destination. Current regulatory and industry standards do not preclude electronic message addresses that imply an association with a legitimate site. For example, there is nothing to prevent a fraudulent party from acquiring the electronic message address of Citibankhelp.com, unless that electronic message has already been reserved by Citibank or some other party.

There remains a clear need for an effective and automated way to protect sensitive data from deceptive and fraudulent e-mail campaigns. Needed are methods, systems, and computer readable media to prevent data from being submitted to a remote system responsive to a malicious e-mail message.

DISCLOSURE OF INVENTION

Methods, systems, and computer-readable media prevent data from being submitted to a remote system responsive to a malicious electronic message. An electronic message manager (100) examines (210) incoming electronic messages and determines (220) whether an incoming message comprises at least one suspect link associated with a remote system. In response to the determination (220) that the incoming message comprises at least one suspect link, the electronic message manager (100) replaces (230) each suspect link with a redirection link. In response to a user attempting (240) to connect to the remote system by clicking on the redirection link, the electronic message manager (100) directs the user to a remote analysis site for deciding (260) whether that incoming message comprises a phishing message.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

These and other more detailed features of the present invention are more fully disclosed in the following specification, reference being had to the accompanying drawings, in which.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

An electronic message manager 100 examines incoming electronic messages such as e-mails, instant messages, text messages following the SMS protocol, etc. to determine if they comprise at least one embedded link associated with a remote system. Each link identified by the electronic message manager 100 is replaced with a redirection link prior to the electronic message arriving to the user. When the user selects the link in an attempt to connect with the remote system, the redirection link directs the user, at least temporarily, to an analysis site where the legitimacy of the remote system associated with the original link is determined. When the legitimacy of the remote system associated with the link is found wanting, the electronic message manager 100 concludes the e-mail message is a malicious e-mail message and takes appropriate steps to prevent data from being submitted.

The electronic message manager 100 offers the following advantages over the prior art:
 isolating remote system links from the user;
 delaying the analysis of a remote system until its link is selected;
 relieving the user from determining whether a link is legitimate; and
 limiting the analysis of remote systems to links chosen by a user.

Figure 1:
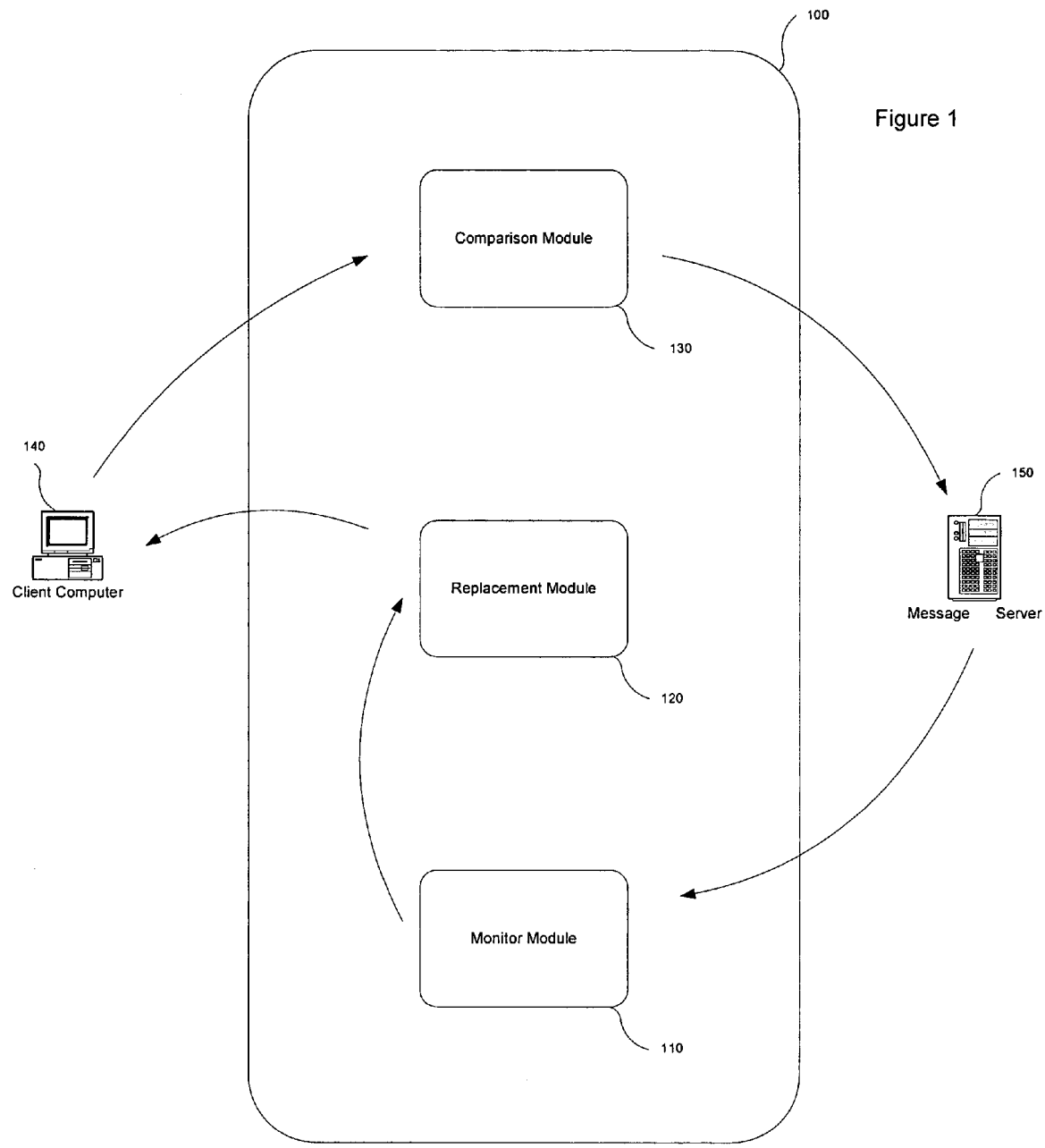
FIG. 1 is a high level block diagram of a system for preventing data from being submitted to a remote system responsive to a malicious e-mail message according to some embodiments of the present invention.

FIG. 1 illustrates a high level block diagram of a system for preventing data from being submitted to a remote system responsive to a malicious e-mail message according to some embodiments of the present invention. It is to be understood that although the electronic message manager 100 is illustrated as a single entity, as the term is used herein an electronic message manager 100 refers to a collection of functionalities which can be implemented as software, hardware, firmware, or any combination of these. Where the electronic message manager 100 is implemented as software, it can be implemented as a standalone program, but can also be implemented in other ways, for example as part of a larger program, as a plurality of separate programs, as one or more device drivers, or as one or more statically or dynamically linked libraries. Likewise, the components of the electronic message manager 100 refer to functionalities. An electronic message manager 100 can be instantiated on and/or as part of a server, client, firewall, intrusion detection system, proxy, gateway, switch and/or any combination of these and/or other computing devices and/or platforms.

In one embodiment of the present invention, the electronic message manager 100 comprises a monitor module 110, a replacement module 120, and a comparison module 130. The monitor module 110 examines 210 incoming electronic messages for the presence of embedded links to remote systems. Implementation methodologies for monitoring and examining the content and form of electronic messages are known within the art, and the specifics of their application in the context of the present invention will be apparent to one of ordinary skill in the relevant art in the light of this specification. Once a message is discovered possessing at least one link, each link is replaced 230 with a redirection link by the replacement module 120. When a user (or software program acting on behalf of that user) attempts 240 to contact the remote system by clicking on the embedded link or otherwise retrieve data associated with that link, the request is redirected, in one embodiment of the present invention, to an intermediary server by the redirection link. In that embodiment, the comparison module 130 then analyzes 245 the remote system associated with the original link to determine its validity. For example, in one embodiment the electronic message manager 100 compares 250 the remote system associated with the original link to a blacklist of known illegitimate remote systems. Responsive to this comparison, the electronic message manager 100 determines whether the remote system associated with the original link is fraudulent. In other embodiments of the present invention, examination of the link and/or data returned by the server referenced by the link is used to determine the legitimacy of the remote system associated with the original link. As the analysis 245 of the remote system associated with the original link occurs separate from the client computer 140, client software such as Internet browsers, electronic mail programs, and other programs residing on the client, remain unaffected by the legitimacy, or illegitimacy, of the original link.

While not necessarily residing at the same location or within the same device, the three modules interact to provide various electronic message manager 100 functionalities. According to one embodiment of the present invention, and as shown in FIG. 1, an electronic message manager 100 is interposed between, and communicatively coupled to, a client computer 140 and a computing device such as a server 150. In another embodiment, the monitor module 110 and the replacement module 120 reside within the client computer 140, and the comparison module 130 resides on a separate computing device. The comparison module 130 can reside separately within a server and communicate with the monitor module 110 and replacement module 120 without detrimentally affecting the functionality and effectiveness of the electronic message manager 100. In another embodiment, all components of the electronic message manager 100 can reside on a client computer 140, while in yet another embodiment all components of the electronic message manager 100 can reside in a server 150.

Figure 2:
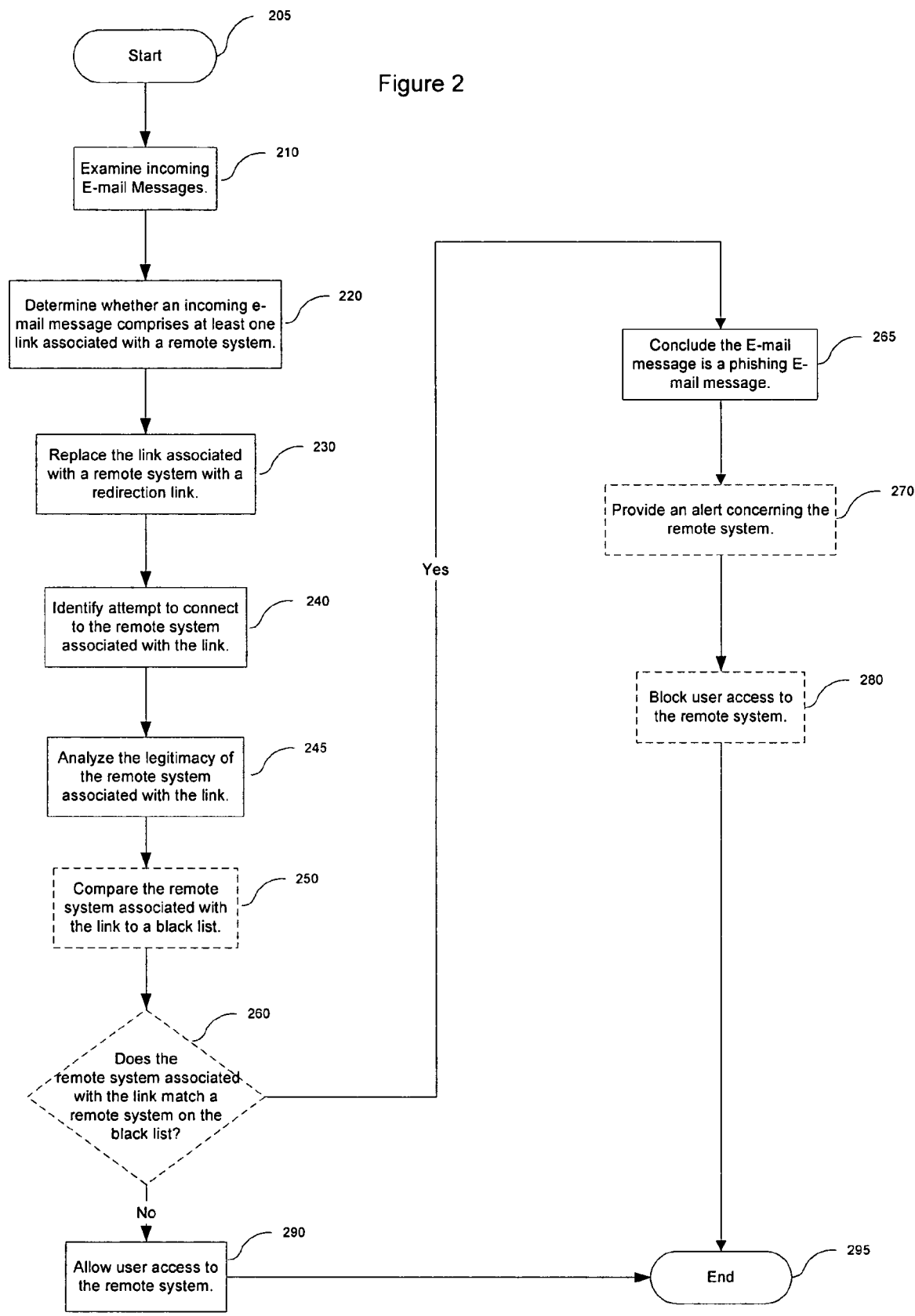
FIG. 2 is a flow diagram for preventing data from being submitted to a remote system responsive to a malicious e-mail message according to some embodiments of the present invention.

FIG. 2 is a flow diagram for preventing data from being submitted to a remote system responsive to a malicious e-mail message, according to some embodiments of the present invention. Prior to an electronic message, such as an e-mail message, arriving at a recipient's inbox, the electronic message manager 100 examines 210 the message for evidence of at least one link associated with a remote system. In some embodiments, the electronic message manager 100 scans an e-mail stream traveling over a network 460 to a client computer 140. In other embodiments, the electronic message manager 100 resides at least partially on the client 150, and examines 210 the incoming electronic messages thereon. In yet another embodiment of the present invention, the electronic message manager 100 filters incoming e-mail messages on an e-mail server. These and other implementation methodologies for examining 210 incoming electronic messages may be successfully utilized by the electronic message manager 100. These implementation methodologies are known within the art and the specifics of their application in the context of the present invention will be apparent to one of ordinary skill in the relevant art in light of this specification.

As messages are identified as possessing links to remotes systems, the links are replaced 230 with redirection links. For example, a link such as <A HREF="http://www.citybank.com/login.jsp"> is replaced by the link <A HREF="http//www.resolve.symantec.com/resolver?www.citybank.com/login.jsp">. When a user attempts to connect 240 with the citybank.com remote system by clicking on the hypertext in the e-mail message, the user's e-mail client or similar network communications process delivers the original remote system URL of citybank.com (this includes the remote system address, the page requested, and any parameters to that request), to the electronic message manager's 100 comparison module 130. In one embodiment of the present invention, the remote system associated with the original link is compared 260 to a blacklist of remote systems known to be illegitimate. In that embodiment, when the remote system associated with the original link does not match any of the remote systems listed on the blacklist, the electronic message manager 100, in one embodiment of the present invention, allows user to access 290 the remote system. In another embodiment of the present invention, the remote system is compared to a whitelist of remote systems known to legitimate. Finding that the remote system associated with the link matches a remote system on the whitelist offers the user further evidence that the remote system is legitimate and that the e-mail message is not malicious. In other embodiments of the present invention, the URL, and/or, data and parameters associated with the URL are analyzed to determine the legitimacy of the remote system associated with the link. These and other techniques for determining the validity of a URL can be successfully utilized by the electronic message manager 100. The implementation methodologies of these techniques are well known within the art and the specifics of their application within the context of the present invention will be apparent to on of ordinary skill in the relevant art in light of this specification.

In one embodiment of the present invention, when the remote system associated with the original link matches a remote system on the blacklist of illegitimate remotes systems, the electronic message manager 100 concludes 265 that the e-mail message is likely a phishing e-mail message. Responsive to the conclusion that the e-mail message is a phishing message, the electronic message manager 100 conveys to the client computer 140 that the submission of data to this remote system is prevented. In another embodiment of the present invention, the electronic message manager 100 returns an alert 270 to the client computer 140 concerning the nature of the remote system, and/or blocks 280 access to the remote system entirely.

Figure 3:
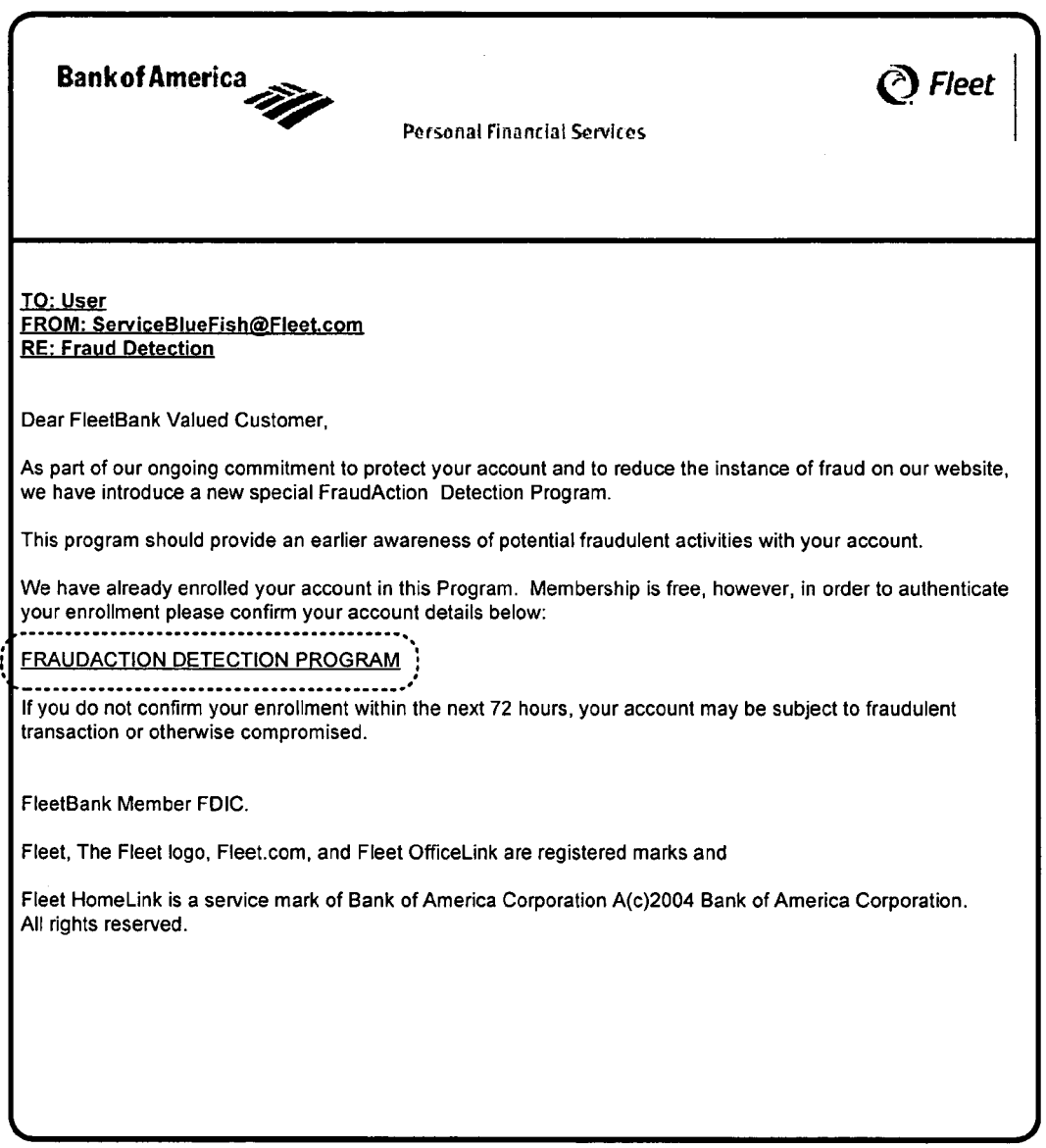
FIG. 3 is a visual depiction of a phishing e-mail.

FIG. 3 illustrates an example of a suspicious electronic message comprising a link to a remote system. As can be appreciated by one of ordinary skill in the relevant art, contents of legitimate electronic messages can be obtained and copied from websites and other e-mails. Criminals can create an e-mail that nearly replicates a legitimate e-mail. While there are legal consequences for such pilfering of copyrighted material, the replication is not a technical challenge. As illustrated, text from a legitimate electronic message from Bank of America can be copied to build a phishing message with an appearance of authenticity having a link to a fraudulent remote system.

As described herein, a recipient's incoming e-mail is examined 210 by the electronic message manager 100 for messages having links, such as the one shown in FIG. 3. The examination of the message locates the URL link "FRAUDACTION DETECTION PROGRAM" 330 in the text of the message, and determines the address pointed to by the link. For example, the address may comprise http:///www.bankofamerica.com/login. asp/230094.checksum/dataverification/entersite@stealmyidentity.com. While this address is displayed on the e-mail message, it appears on the address bar of the web browser. Everything to the left of the "@" symbol specifies the user name to that remote system. The actual remote system is stealmyidentity.com and not bankofamerica.com. Responsive to identifying such a link, the electronic message manager 100 replaces the link associated with the text "FRAUDACTION DETECTION PROGRAM" with one that redirects the user to the comparison module 130. When the user attempts to contact the FRAUDACTION DETECTION PROGRAM the comparison module 130 determines that stealmyidenty.com is a known illegitimate remote system and takes appropriate action(s) to prevent the user from unknowingly submitting data to that fraudulent remote site.

Figure 4:
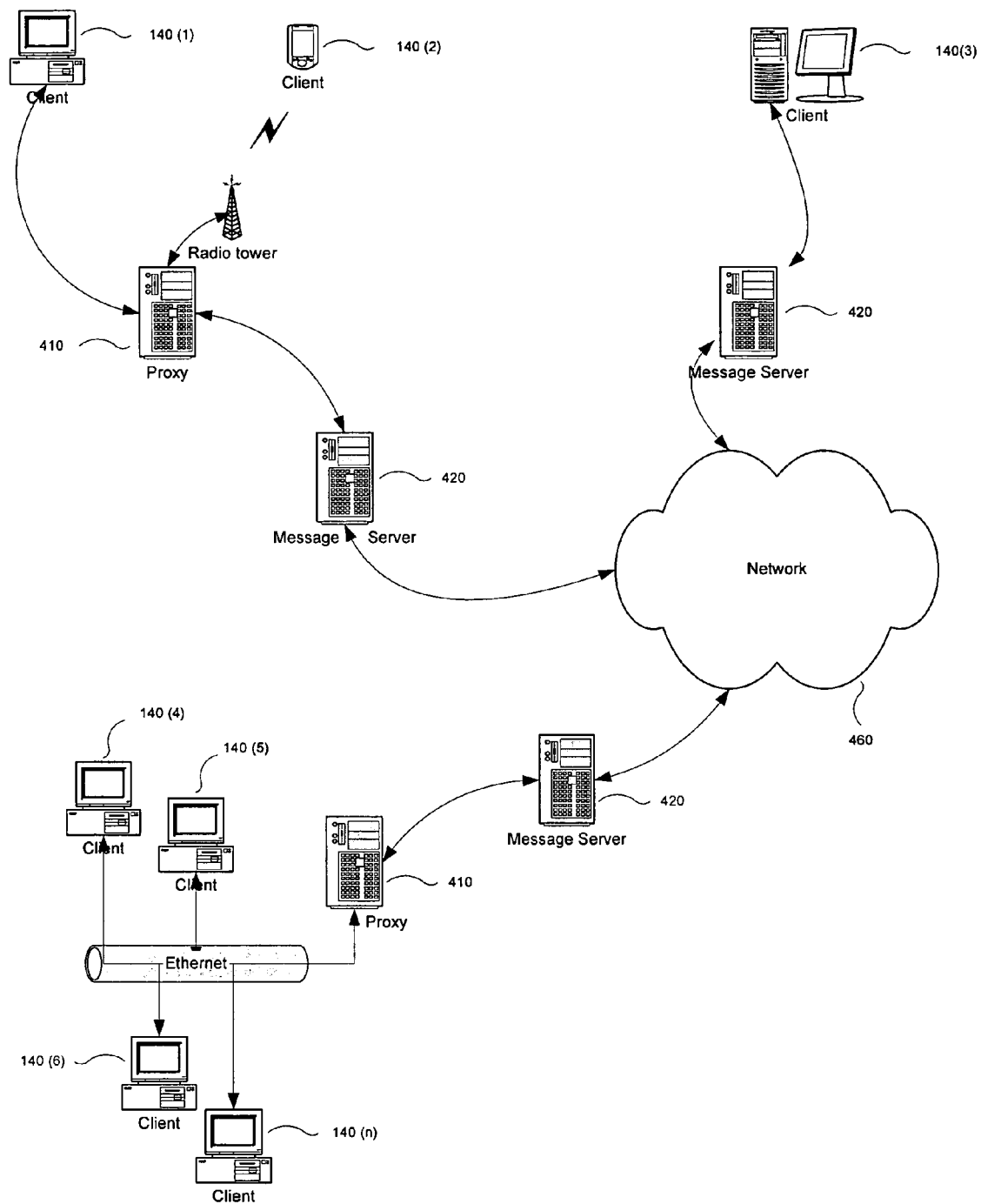
FIG. 4 is a block diagram of a network configuration for detecting phishing e-mails according to one embodiment of the present invention.

FIG. 4 is a high level block diagram illustrating the implementation of one embodiment of the present invention in a network environment. As described herein, an electronic message manager 100 can reside entirely on a client computer 140 such as a desktop, laptop, PDA, etc. An electronic message manager 100 can also reside on a proxy device 410 interposed between one or more client computers 140 and the network 460, electronic message server 420, or the like. In yet another embodiment of the present invention, the electronic message manager 100 can reside on an SMTP or similar message server 420 or be functionally distributed between or among multiple computing devices. Although exemplary embodiments are described herein using the words "client" and "server," the terms "client" and "server" are chosen for convenience and might not necessarily correspond directly to any particular role in a system design.

While it is contemplated that the present invention will be used on individual network computers, it is possible to apply the methodology presented here to network environments with multiple computers in several locations. Although not required, method embodiments of the invention can be implemented via computer-executable instructions, such as routines executed by a general purpose computer, e.g., a server or client computer. The computer-executable instructions can be embodied in hardware, firmware, or software residing on at least one computer-readable medium, such as one or more hard disks, floppy disks, optical drives, flash memory, Compact Disks, Digital Video Disks, etc. Those skilled in the relevant art will appreciate that the invention can be practiced with other computer system configurations including Internet appliances, hand-held devices, wearable computers, cellular or mobile phones, multi-processor systems, microprocessor-based or programmable consumer electronics, set-top boxes, network PCs, mini-computers, mainframe computers, and the like.

The invention can be embodied in a special purpose computer or data processor that is specifically programmed, configured, or constructed to perform at least one of the computer-executable instructions as explained herein. The invention can also be practiced in distributed computing environments where tasks or modules are performed by remote processing devices linked through a communications network. In a distributed computing environment, program modules may be located in both local and remote memory storage devices. Furthermore, for purposes of this patent application, "malicious computer code" comprises computer code commonly referred to as computer viruses, worms, Trojan horses, spam, spy-ware, and any other type of unauthorized or unsolicited computer code that appears in or on a computer without an authorized user's knowledge and/or without an authorized user's consent.

The above description is included to illustrate the operation of various embodiments of the invention, and is not meant to limit the scope of the invention. The elements and steps of the various embodiments described above can be combined to provide further embodiments. The scope of the invention is to be limited only by the following claims. Accordingly, from the above discussion, many variations will be apparent to one of ordinary skill in the art that would yet be encompassed by the spirit and scope of the present invention.

What is claimed is:

1. A computer implemented method for preventing data from being submitted to a remote system responsive to a malicious electronic message, the method comprising the steps of:

examining incoming electronic messages;

determining whether an incoming electronic message comprises at least one suspect link associated with a remote system;

responsive to determining that the incoming message comprises at least one suspect link, replacing each suspect link with a redirection link; and responsive to a user attempting to connect to the remote system by clicking on the redirection link, directing the request to connect to the remote system to a remote analysis site for deciding whether that incoming message comprises a phishing message.

2. The method of claim 1 wherein the directing step further comprises:
comparing each remote system associated with the suspect link to a list concerning known remote systems.

3. The method of claim 2 wherein the list concerning known remote systems comprises a blacklist comprising addresses of known illegitimate remote systems.

4. The method of claim 3 further comprising the step of:
responsive to each remote system associated with the suspect link not matching a known illegitimate remote system on the blacklist, concluding that the incoming message is not a phishing message.

5. The method of claim 4 further comprising the step of:
responsive to concluding that the message does not comprise a phishing message, allowing user access to the remote system.

6. The method of claim 3 further comprising the step of:
responsive to each remote system associated with the suspect link matching at least one known illegitimate remote system on the blacklist, concluding that the incoming message is a phishing message.

7. The method of claim 6 further comprising the step of:
responsive to concluding that the incoming message is a phishing message, performing at least one step from the group of steps consisting of:
blocking user access to the remote system; and
outputting an alert concerning the remote system.

8. The method of claim 2 wherein the list concerning known remote systems comprises a whitelist containing addresses of known legitimate remote systems.

9. The method of claim 8 further comprising the step of:
responsive to each remote system associated with the suspect link matching a known legitimate remote system on the whitelist, concluding that the incoming message is not a phishing message.

10. The method of claim 9 further comprising the step of:
responsive to concluding that the message does not comprise a phishing message, allowing user access to the remote system.

11. The method of claim 1 wherein the step of examining incoming messages comprises:
scanning an e-mail stream targeted to an e-mail client.

12. The method of claim 1 wherein the step of examining incoming messages comprises:
filtering incoming messages on a server.

13. The method of claim 1 wherein the step of determining whether an incoming electronic message comprises at least one suspect link associated with a remote system comprises:
analyzing each suspect link for known deceptive characteristics.

14. At least one computer-readable medium containing a computer program product for preventing data from being submitted to a remote system responsive to a malicious message, the computer program product comprising:
program code for examining incoming messages;
program code for determining whether an incoming message comprises at least one suspect link associated with a remote system;
program code for replacing the at least one suspect link with a redirection link responsive to determining that the incoming message comprises at least one suspect link; and
program code for directing the request to connect to the remote system to a remote analysis site for deciding whether that incoming message comprises a phishing message responsive to a user attempting to connect to the remote system by clicking on the redirection link.

15. The at least one computer-readable medium of claim 14 wherein the computer program product for the directing step further comprises:
program code for comparing each remote system associated with the suspect link to a list concerning remote systems.

16. The at least one computer-readable medium of claim 15 wherein the computer program product for the list concerning known remote systems comprises program code for a blacklist comprising addresses of known illegitimate remote systems.

17. The at least one computer-readable medium of claim 16 wherein the computer program product further comprises:
program code for concluding that the incoming message is not a phishing message responsive to each remote system associated with the suspect link not matching a known illegitimate remote system on the blacklist.

18. The at least one computer-readable medium of claim 17 wherein the computer program product further comprises:
program code for allowing user access to the remote system responsive to concluding that the message does not comprise a phishing message.

19. The at least one computer-readable medium of claim 16 wherein the computer program product further comprises:
program code for concluding that the incoming message is a phishing message responsive to each remote system associated with the suspect link matching at least one known illegitimate remote system on the blacklist.

20. The at least one computer-readable medium of claim 19 wherein the computer program product further comprises:
program code for performing at least one step from the group of steps
responsive to concluding that the incoming message is a phishing message, the group of steps consisting of:
blocking user access to the remote system; and
outputting an alert concerning the remote system.

21. The at least one computer-readable medium of claim 15 wherein the computer program product for the list concerning known remote systems comprises program code for a whitelist comprising addresses of known legitimate remote systems.

22. The at least one computer-readable medium of claim 21 wherein the computer program product further comprises:
program code for concluding that the incoming message is not a phishing message responsive to each remote system associated with the suspect link matching a known legitimate remote system on the whitelist.

23. The at least one computer-readable medium of claim 22 wherein the computer program product further comprises:
program code for allowing user access to the remote system responsive to concluding that the message does not comprise a phishing message.

24. The at least one computer-readable medium of claim 14 wherein the computer program product for the step of examining incoming messages comprises:
program code for scanning a stream targeted to a client.

25. The at least one computer-readable medium of claim 14 wherein the computer program product for the step of examining incoming messages comprises:
program code for filtering incoming messages on a server.

26. A computer system for preventing data from being submitted to a remote system responsive to a malicious electronic message, the computer system comprising:

a monitor module configured to examine incoming electronic messages, and determine whether an incoming message comprises at least one suspect link associated with a remote system;

a replacement module configured to replace each suspect link with a redirection link responsive to determining that the incoming message comprises at least one suspect link; and a comparison module configured to direct the request to connect to the remote system to a remote analysis site for deciding whether that incoming message comprises a phishing message responsive to a user attempting to connect to the remote system by clicking on the redirection link.

* * * * *